(12) United States Patent
Park et al.

(10) Patent No.: US 6,396,823 B1
(45) Date of Patent: May 28, 2002

(54) BASE STATION TRANSCEIVER FOR FREQUENCY HOPPING CODE DIVISION MULTIPLE ACCESS SYSTEM

(75) Inventors: Jong-Hyeon Park, Seoul; Je-Woo Kim, Songnam-shi, both of (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/222,669

(22) Filed: Dec. 29, 1998

(30) Foreign Application Priority Data

Dec. 29, 1997 (KR) ............................................. 97-76013

(51) Int. Cl.[7] ............................................. H04B 7/216
(52) U.S. Cl. ........................ 370/335; 375/131; 375/132; 455/561; 455/451; 370/277; 370/330; 370/342
(58) Field of Search .................................. 370/277, 328, 370/330, 334, 335, 336, 337, 342, 343, 345, 347; 375/131, 132, 133, 260, 295, 305, 300; 455/73, 561, 451, 452, 562

(56) References Cited

U.S. PATENT DOCUMENTS

| | | | | |
|---|---|---|---|---|
| 4,694,466 A | * | 9/1987 | Kadin ............................ | 375/1 |
| 4,829,540 A | | 5/1989 | Waggener, Sr. et al. ......... | 375/1 |
| 5,459,759 A | * | 10/1995 | Schilling ..................... | 375/202 |
| 5,570,352 A | * | 10/1996 | Poyhonen .................... | 370/18 |
| 5,657,343 A | | 8/1997 | Schilling ..................... | 375/202 |
| 5,715,275 A | * | 2/1998 | Emi ............................. | 375/202 |
| 5,719,857 A | | 2/1998 | Heikkinen ................... | 370/330 |
| 5,802,110 A | | 9/1998 | Watanabe et al. ........... | 375/259 |
| 5,970,055 A | * | 10/1999 | Park et al. .................. | 370/280 |

* cited by examiner

Primary Examiner—Ricky Ngo
Assistant Examiner—Tri Phan
(74) Attorney, Agent, or Firm—Robert E. Bushnell, Esq.

(57) ABSTRACT

A small and lightweight base station transceiver utilizes a plurality of low-powered time division duplexing switches instead of a single high-powered time division duplexing switch. The base station transceiver includes a forward signal path, a reverse signal path, and a plurality of time division duplexing switches being switchable to the forward signal path or the reverse signal path according to a time division duplexing timing control signal generated from a time division duplexing timing controller. The plurality of time division duplexing switches corresponds to N time division duplexing switches where the symbol N represents a number. Output signals of the time division duplexing switches are filtered in a plurality of N bandpass filters, coupled in a junction coupler, and then radiated in the air through first and second antennas. The junction coupler couples the outputs of odd-numbered bandpass filters to transfer the coupled signals to the first antenna, and couples the outputs of even-numbered bandpass filters to transfer the coupled signal to the second antenna, so as to reduce mutual interference among the channels.

20 Claims, 8 Drawing Sheets

BASE STATION TRANSCEIVER FOR FREQUENCY HOPPING CODE DIVISION MULTIPLE ACCESS SYSTEM

CLAIM OF PRIORITY

This application makes reference to, incorporates the same herein, and claims all benefits accruing under 35 U.S.C. §119 from an application entitled Base Station Transceiver for FH/CDMA System earlier filed in the Korean Industrial Property Office on Dec. 29, 1997, and there duly assigned Ser. No. 97-76013, a copy of which is annexed hereto.

BACKGROUND OF THE INVENTION

1. Technical Field

The present invention relates to a frequency hopping/code division multiple access (FH/CDMA) system and, more particularly to a base station transceiver for a frequency hopping/code division multiple access system, which employs a junction coupling method utilizing digital switches and bandpass filters.

2. Related Art

A code division multiple access (CDMA) scheme is one of multiple access schemes proposed so that a plurality of radio stations can simultaneously make radio communication between them in the same frequency band. A frequency division multiple access (FDMA) scheme and a time division multiple access (TDMA) scheme are other schemes. The code division multiple access scheme is advantageous over the frequency division multiple access scheme and is also advantageous over the time division multiple access scheme in that the code division multiple access scheme exhibits higher efficiency of frequency utilization and can accommodate more users.

In the code division multiple access scheme, the multiple access is made by means of spread spectrum communication in which, prior to transmission of an information signal, the spectrum of the information signal is spread over a band sufficiently wide as compared to the original bandwidth of the information signal. A direct spread scheme refers to a scheme in which an information signal is directly multiplied by a spreading code in a spreading process. A frequency hopping scheme refers to a scheme in which a carrier frequency of a signal modulated by information is changed over in a discrete mode within a given frequency band. A hybrid code division multiple access scheme refers to a code division multiple access scheme in which the direct spread scheme and the frequency hopping scheme are combined.

A packet is a block of data used for transmission in packet switched systems. Data becomes packetized when it is divided up into blocks of data or packets of data. Thus, packetized data is data which is divided up into blocks of data for transmission in a packet switching network. The phrase code division multiple access (CDMA) refers to a scheme which uses a spread spectrum technique that codes each digital packet and allows multiple telephone calls to be placed on one channel, boosting caller capacity 20 times, or more, over that of an analog network. The phrase frequency hopping refers to a wireless modulation method that rapidly changes the center frequency of a transmission.

A first original signal is said to be modulated when the amplitude, frequency, or phase of the first original signal is varied in accordance with a second signal. A process of demodulation occurs when the first original signal is recovered after having been modulated.

The phrase time division multiplexing (TDM) refers to a technology that transmits multiple signals simultaneously over a single transmission path. In time division multiplexing, each lower-speed signal is time sliced into one high-speed transmission. For example, two incoming 1000 bits per second (bps) signals can be interleaved into one 2000 bits per second signal. If the two incoming signals are represented by the symbols X and Y respectively, then the interleaved signal may appear as a single stream of data as follows: XXYYXXYYXXYYXXYY. The receiving end divides the single stream back into the two original signals.

In cellular radio systems, the quality of a radio channel varies as a function of time and place. On many occasions, a transmitting antenna and a receiving antenna are not within sight of each other due to obstacles formed by terrain or buildings in the line of sight, and thus the signal detected at the receiver is a sum of beams that have traveled different paths and have been reflected from obstacles and that are, further, with different phases. The sum of several signals with different phases follows the Rayleigh distribution in cases of randomly distributed phases.

Signal fading is, furthermore, dependent on the frequency of the signal. Thus, if a frequency difference between two signals is great enough, their fadings do not correlate. A difference of 1 megahertz (MHz), for example, is large enough for signal fadings to be independent of each other.

The frequency selective fading of a signal described above is one reason for the introduction of frequency-hopping technology in digital cellular radio networks. Frequency-hopping means that the transmission frequency used in a connection is changed at predetermined intervals. Due to frequency-hopping, the transmission quality can be improved especially in situations in which the terminal equipment moves very slowly, or not at all, as is often the case with, for example, hand-held phones.

Apart from the frequency diversity achieved by frequency-hopping, the method is also advantageous in distributing the interference caused by the radio connection onto several frequencies, in which case momentary interference on any one frequency will remain small.

In some instances, if frequency-hopping is desired in a cell served by a base station, the base station equipment must be provided with at least two complete transceiver units which contain base band sections and radio frequency sections. Each unit, as such, can form an independent base station, but to implement frequency-hopping several complete transceiver units are required in the same cell. Therefore, in some instances, the base station equipment capable of frequency-hopping can be disproportionately large in small cells in comparison with the capacity needed, and the implementation of frequency-hopping can thus require heavy investments.

I have found that a communications base station transceiver has the disadvantages of high power consumption, heavy weight, and large size. Efforts have been made to improve communication systems and methods.

Exemplars of recent efforts in the art include U.S. Pat. No. 5,802,110 for Wireless Mobile System issued to Watanabe et al., U.S. Pat. No. 5,719,857 for Method and Apparatus for Implementing Frequency-hopping in a Base Station issued to Heikkinen, U.S. Pat. No. 5,657,343 for Frequency Hopping Code Division Multiple Access System and Method issued to Schilling, U.S. Pat. No. 5,570,352 for Digital Cellular Network/system with Mobile Stations Communicating with Base Stations Using Frequency-hopping and Having Enhanced Effect of Interference Diversity issued to Pöyhönen, U.S. Pat. No. 5,459,759 for Frequency Hopping Code Division Multiple Access System and Method issued to Schilling, and U.S. Pat. No. 4,829,540 for Secure Communication System for Multiple Remote Units issued to Waggener, Sr. et al.

While these recent efforts provide advantages, I note that they fail to adequately provide a method for efficiently and conveniently providing a small and lightweight base station transceiver for a frequency hopping/code division multiple access communication system.

SUMMARY OF THE INVENTION

It is therefore an object of the present invention to provide a small and lightweight base station transceiver with a junction coupler utilizing digital switches and bandpass filters.

It is another object of the present invention to provide a small and lightweight base station transceiver including a plurality of low-powered time division duplexing (TDD) switches instead of a single high-powered time division duplexing switch.

To achieve the above objects, the present invention provides a base station transceiver for a frequency hopping/code division multiple access system including N forward pre-processors for scrambling Bose-Chaudhuri-Hocquenghem (BCH) encoded control/signaling data and interleaved traffic data, packetizing the scrambled data, and generating hopping frequency control data; a forward signal switch for switching signals output from the forward pre-processors; N forward post-processors for lowpass-filtering signals output from the forward signal switch, frequency-modulating the lowpass-filtered signals with a transmission frequency synthesizing signal, and filtering and amplifying the frequency-modulated signals at a transmission frequency band; a transmission/reception selector for selecting a transmission or reception path; N reverse pre-processors for demodulating received signals selected by the transmission/reception selector with a reception frequency synthesizing signal to restore clock and data, and detecting a received signal strength indication signal; a reverse signal switch for switching signals output from the reverse pre-processors; N reverse post-processors for measuring signal-to-noise ratios of signals output from the reverse signal switch, and de-packetizing and descrambling the signals output from the reverse signal switch to divide the signals into the traffic data and the control/signaling signal; and a time division duplexing timing controller for generating a time division duplexing timing control signal for controlling the transmission/reception selector.

To achieve these and other objects in accordance with the principles of the present invention, as embodied and broadly described, the present invention provides an apparatus, comprising: a plurality of first preprocessing units receiving and then scrambling first control data, signal data, and traffic data, packetizing the scrambled data to divide the scrambled data into packets, generating frequency control data controlling hopping frequencies, and outputting said packetized data and said frequency control data; a first signal switch switching said packetized data and said frequency control data output from said plurality of first preprocessing units, and outputting primary signals corresponding to said switched data; a plurality of first postprocessing units lowpass-filtering said primary signals output from said first signal switch, frequency modulating said lowpass-filtered signals with a secondary signal synthesizing transmission frequency, and filtering and amplifying said frequency modulated signals at a transmission frequency band; a selection unit selecting a path from among a transmission path and a reception path; a plurality of second preprocessing units demodulating received signals selected by said selection unit with a tertiary signal synthesizing reception frequency to restore clock and data, and detecting a received signal strength indication signal; a second signal switch switching signals output from said plurality of second preprocessing units; a plurality of second postprocessing units measuring signal-to-noise ratios of signals output from said second signal switch, and de-packetizing and unscrambling said signals output from said second signal switch to divide said signals into said first control data, said signal data, and said traffic data; and a control unit being coupled to said selection unit and generating a timing control signal utilizing time division duplexing to control said selection unit, wherein said apparatus corresponds to a base station transceiver for a frequency hopping code division multiple access system.

To achieve these and other objects in accordance with the principles of the present invention, as embodied and broadly described, the present invention provides an apparatus, comprising: a plurality of N forward preprocessors respectively processing transmission signals of a plurality of N channels, wherein the symbol N represents a number corresponding to a quantity; a forward signal switch switching said transmission signals to unused channels; a plurality of N forward postprocessors processing output signals of said forward signal switch; a plurality of N time division duplexing switches being switchable to a path selected from among a forward signal path and a reverse signal path according to a timing control signal utilizing time division duplexing, said N time division duplexing switches respectively receiving said processed signals output from said N forward postprocessors; a timing controller generating said timing control signal; a plurality of N bandpass filters bandpass-filtering output signals of said time division duplexing switches; a junction coupler coupling output signals of said bandpass filters; first and second antennas transmitting coupled signals output from said junction coupler, and receiving radio signals; said bandpass filters bandpass-filtering said radio signals received through said first and second antennas; said time division duplexing switches switching said radio signals to the reverse signal path according to said timing control signal; a plurality of N reverse preprocessors processing output signals of said time division duplexing switches; a reverse signal switch switching the processed signals output from said reverse s preprocessors to unused channels; a plurality of N reverse postprocessors processing the switched signals output from said reverse signal switch, wherein said apparatus corresponds to a base station transceiver for a frequency hopping code division multiple access system.

To achieve these and other objects in accordance with the principles of the present invention, as embodied and broadly described, the present invention provides a method, comprising: receiving and then scrambling first control data, signal data, and traffic data, packetizing the scrambled data to divide the scrambled data into packets, generating frequency control data controlling hopping frequencies, and outputting said packetized data and said frequency control data; switching said packetized data and said frequency control data, and outputting primary signals corresponding to said switched data, said switching of said packetized data and said frequency control data being performed by a first signal switch; lowpass-filtering said primary signals, frequency modulating said lowpass-filtered signals with a secondary signal synthesizing transmission frequency, and filtering and amplifying said frequency modulated signals at a transmission frequency band; selecting a path from among a transmission path and a reception path, said selecting being performed by a plurality of special switches; demodulating received signals when the reception path is selected, said demodulating being performed with a tertiary signal synthesizing reception frequency to restore clock and data, and detecting a received signal strength indication signal; switching demodulated received signals and outputting switched signals, said switching of said demodulated received signals being performed by a second signal switch; measuring signal-to-noise ratios of said switched signals, and de-packetizing and unscrambling said switched signals to divide said signals into said s first control data, said signal data, and said traffic data; and generating a timing control signal utilizing time division duplexing to control said selecting of said path by said plurality of special switches, wherein said method corresponds to operations of a base station transceiver for a frequency hopping code division multiple access system.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to exemplify the principles of this invention.

DETAILED DESCRIPTION OF THE PREFERRED EMBODIMENT

While the present invention will be described more filly hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being abroad, teaching disclosure directed to persons of skill in the appropriate arts, and not as limiting upon the present invention.

Figure 1:
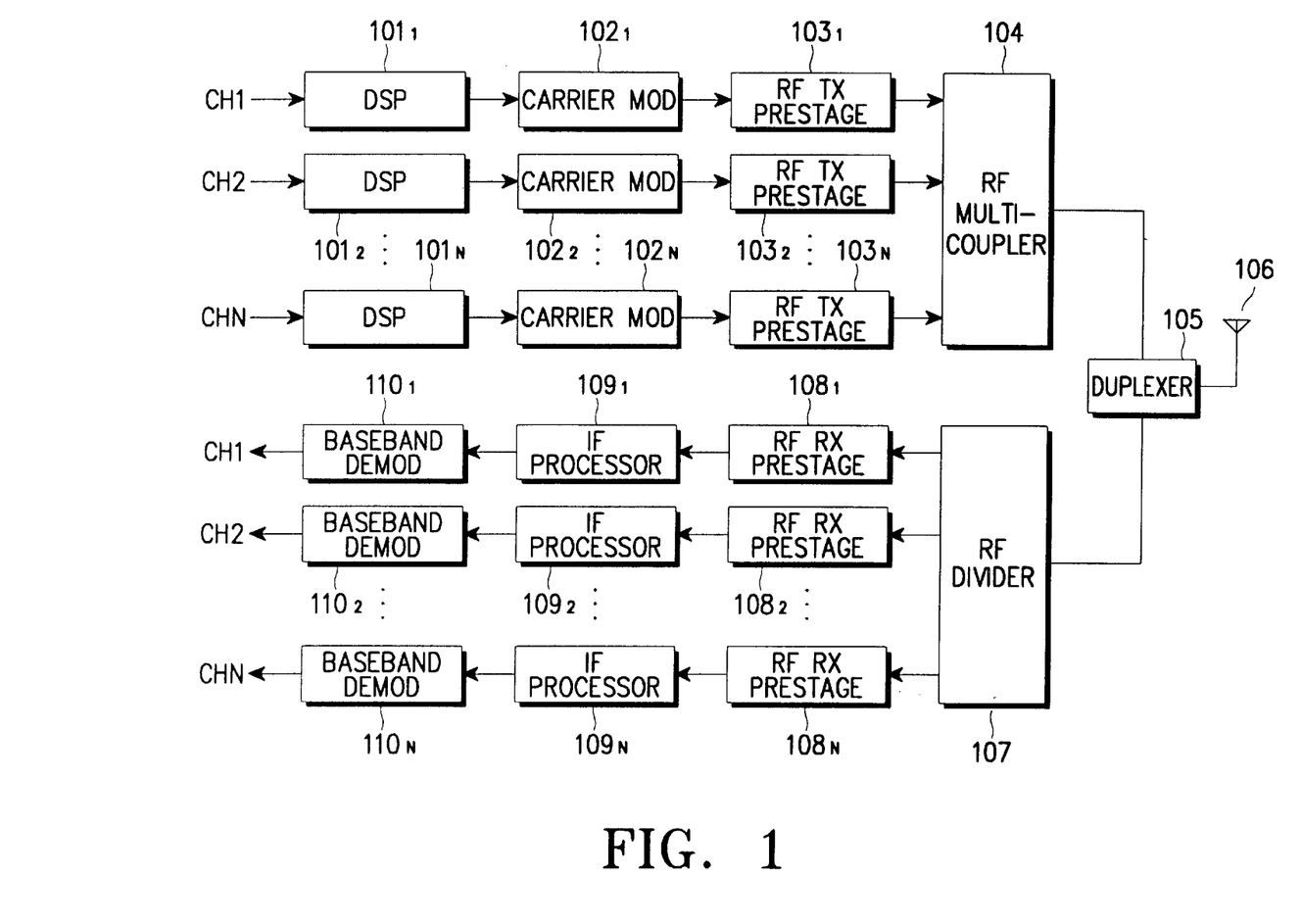
FIG. 1 is a block diagram of a base station transceiver for a frequency hopping/code division multiple access communication system.

Turn now to FIG. 1, which is a block diagram of a base station transceiver for a frequency hopping/code division multiple access communication system. FIG. 1 illustrates a base station transceiver for a frequency hopping/code division multiple access system in which the number of channels is N. In other words, the symbol N corresponds to the number of channels. In the base station transceiver, data on the respective channels are transmitted/received through transmission/reception modules allocated to corresponding channels.

With reference to FIG. 1, during transmission, data allocated, for example, to a first channel CH1 is applied to a digital signal processor (DSP) $101_1$ which performs error correction coding, interleaving, scrambling, framing and baseband modulating functions with respect to the input to channel data. The signal output from the digital signal processor $101_1$ is carried on a carrier in a carrier modulator $102_1$, and then amplified and bandpass-filtered in a radio frequency transmission prestage $103_1$. The signals on the first to N-th channels CH1–CHN, output from the radio frequency transmission prestages $103_1$–$103_N$, are multi-coupled in a radio frequency (RF) multi-coupler 104 and then radiated in the air through a duplexer 105 and an antenna 106.

With continued reference to FIG. 1, during reception, a radio frequency signal received through the antenna 106 is delivered to a receiving section via the duplexer 105. The received signal is divided into N channel signals in a radio frequency divider 107. The divided channel signals are low-noise-amplified, bandpass-filtered and then multiplied by corresponding hopping frequencies, in radio frequency reception prestages $108_1$–$108_N$, so as to generate intermediate frequencies. Here, the intermediate frequencies on the respective channels CH1–CHN are equal to one another. The intermediate frequencies are processed in intermediate frequency (IF) processors $109_1$–$109_N$ which perform amplifying, filtering and automatic gain controlling functions, and are then processed in baseband demodulators $110_1$–$110_N$ which restore clocks and data. In other words, the baseband demodulators $110_1$–$110_N$ demodulate clocks and data.

However, a base station transceiver for the frequency hopping/code division multiple access system as depicted in FIG. 1 can have several problems.

First, when the number of the channels is N, a coupling loss L of the radio frequency multi-coupler 104 caused in coupling the radio frequency signals on the respective channels is very high, thus resulting in a large power loss. The coupling loss is measured in decibels (dB) and calculated by $L=\log_2(N^3)$. For example, when N=8 then $L=\log_2(512)$ and thus L=9 decibels (dB). In this example, the coupling loss of the radio frequency multi-coupler 104 is approximately 9 decibels (dB).

Second, since the radio frequency multi-coupler 104 is generally large in size and weight, it is difficult to make a small and lightweight base station transceiver.

Meanwhile, when the communication service is provided between mobile stations through the base station transceiver or between the mobile stations directly, it is preferable to employ time division duplexing (TDD) rather than frequency division duplexing (FDD) in order to simplify the connection structure of the mobile stations. However, when the time division duplexing is employed, there may occur cases where phases of all the transmission signals coincide with one another. In such a case, that is, when all the transmission signals are in phase, the transmission power should be $N^2$ times (not N times) as high as the transmission power of a single channel. Accordingly, a base station transceiver demands a time division duplexing (TDD) switch satisfying a high power-resistant property sufficient for the transmission power which is $N^2$ times in maximum as high as the transmission power of the single channel. However, it is very difficult to design and realize such a high power-resistant time division duplexing (TDD) switch. Meantime, although the receiving section should employ a linear wideband low-noise amplifier, the radio frequency divider 107 is used instead when the frequency hopping system has a very wide frequency range. In this case, the noise increases by $\log_2(N^3)$ decibels, thus effecting deterioration of the receiving sensitivity.

I have found that a base station transceiver has the disadvantages of the high power consumption, the heavy weight and the large size. Further, the base station transceiver is disadvantageous in that the transmission section includes the time division duplexing (TDD) switch having high coupling loss and the high power-resistant property and the reception section has the increased noises due to the radio frequency divider 107, causing a lowering of the receiving sensitivity. Accordingly, with the structure of FIG. 1, it is difficult to make a small and lightweight base station transceiver for the frequency hopping/code division multiple access communication system.

Figure 2A:
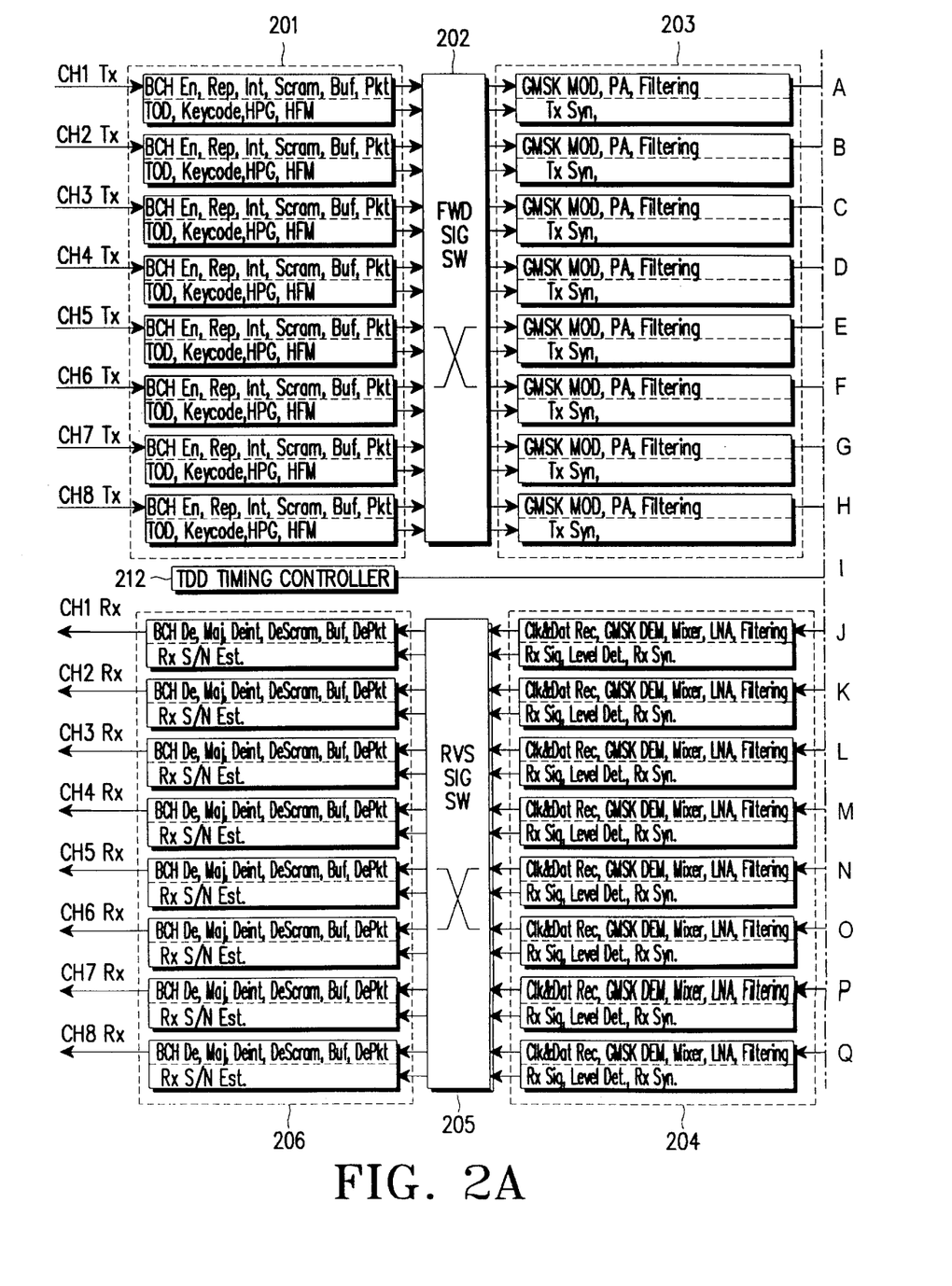
FIGS. 2A and 2B are diagrams of a base station transceiver for a frequency hopping/code division multiple access communication system, in accordance with the principles of the present invention.
Figure 2B:
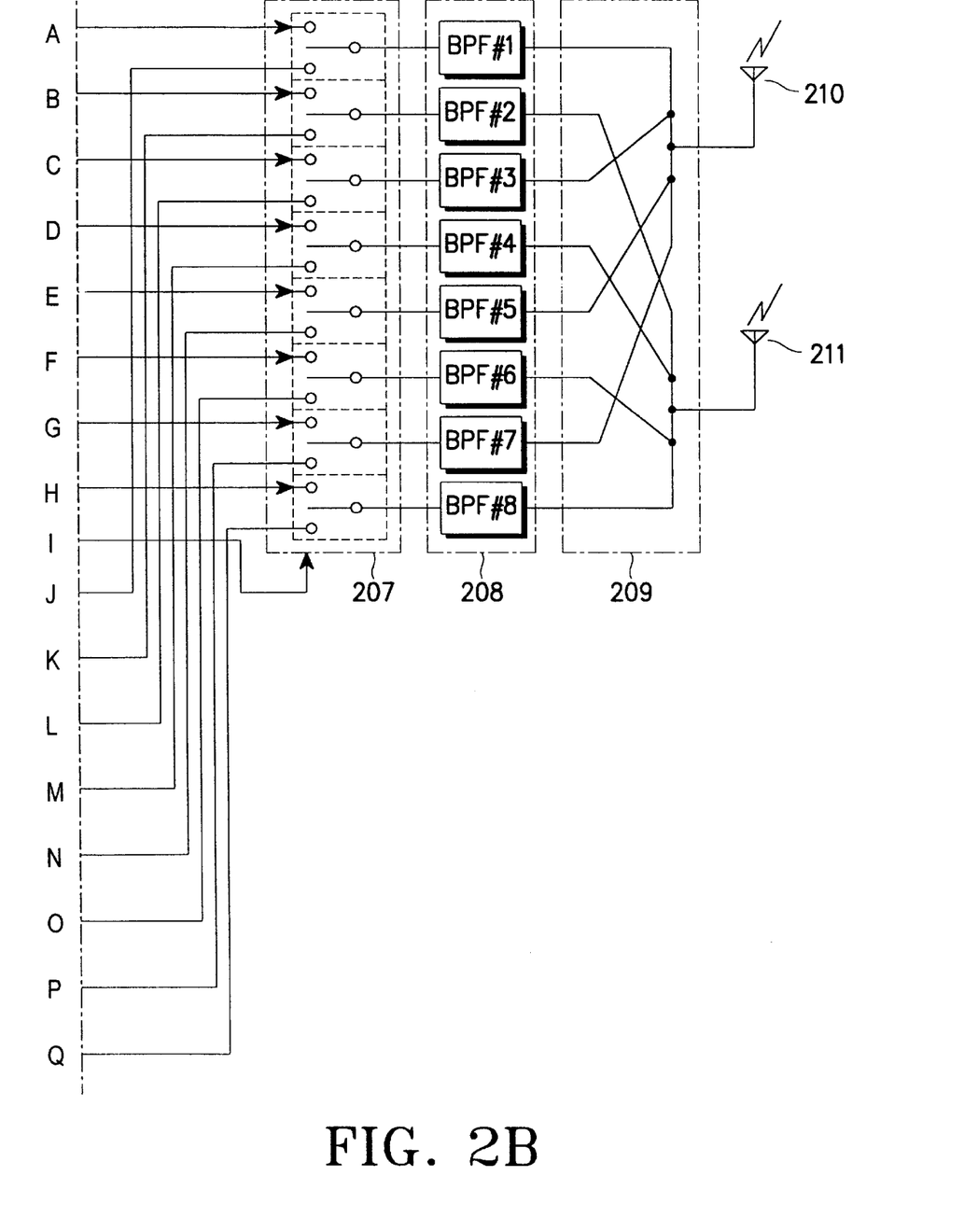

Turn now to FIGS. 2A and 2B, which are diagrams of a base station transceiver for a frequency hopping/code division multiple access communication system, in accordance with the principles of the present invention. FIGS. 2A and 2B show a base station transceiver for a frequency hopping/code division multiple access communication system in which the number of the channels is 8. In other words, N=8. Referring to FIGS. 2A and 2B, the time division duplexing base station transceiver according to the present invention includes a transmission (or forward) signal path, a reception (or reverse) signal path, a time division duplexing timing controller 212 for generating a switching control signal, time division duplexing switches 207 being switchable in response to the switching control signal generated from the time division duplexing timing controller 212, bandpass filters 208, and antennas 210 and 211. The reference numeral 207 here can also refer to transmission/reception selectors 207.

The forward signal path includes N forward pre-processors 201, a forward signal switch 202 and N forward post-processors 203. Similarly, the reverse signal path includes N reverse pre-processors 204, a reverse signal switch 205 and N reverse post-processors 206.

Figure 3A:
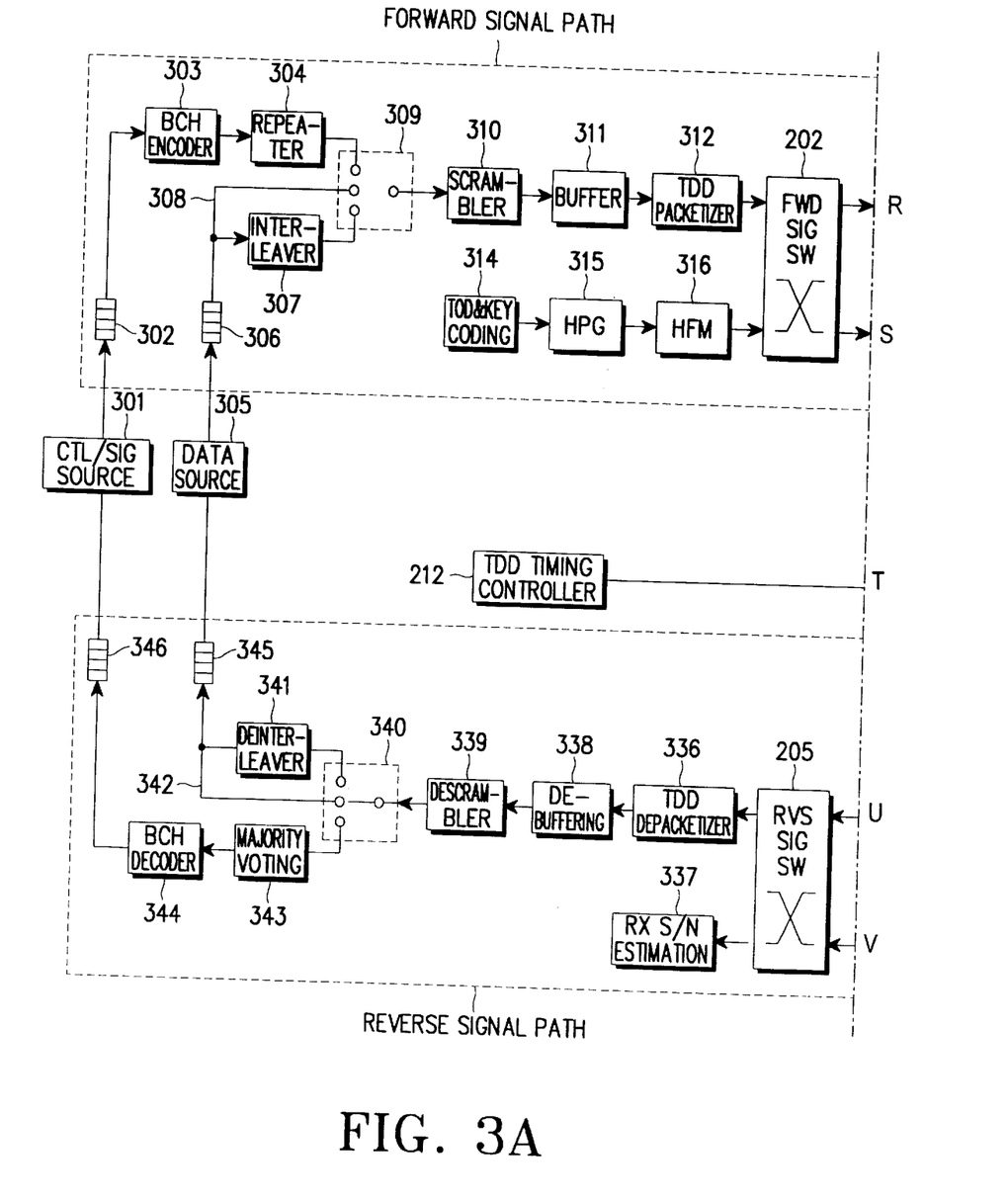
FIGS. 3A and 3B are detailed diagrams of transmission and reception signal paths, in accordance with the principles of the present invention.
Figure 3B:
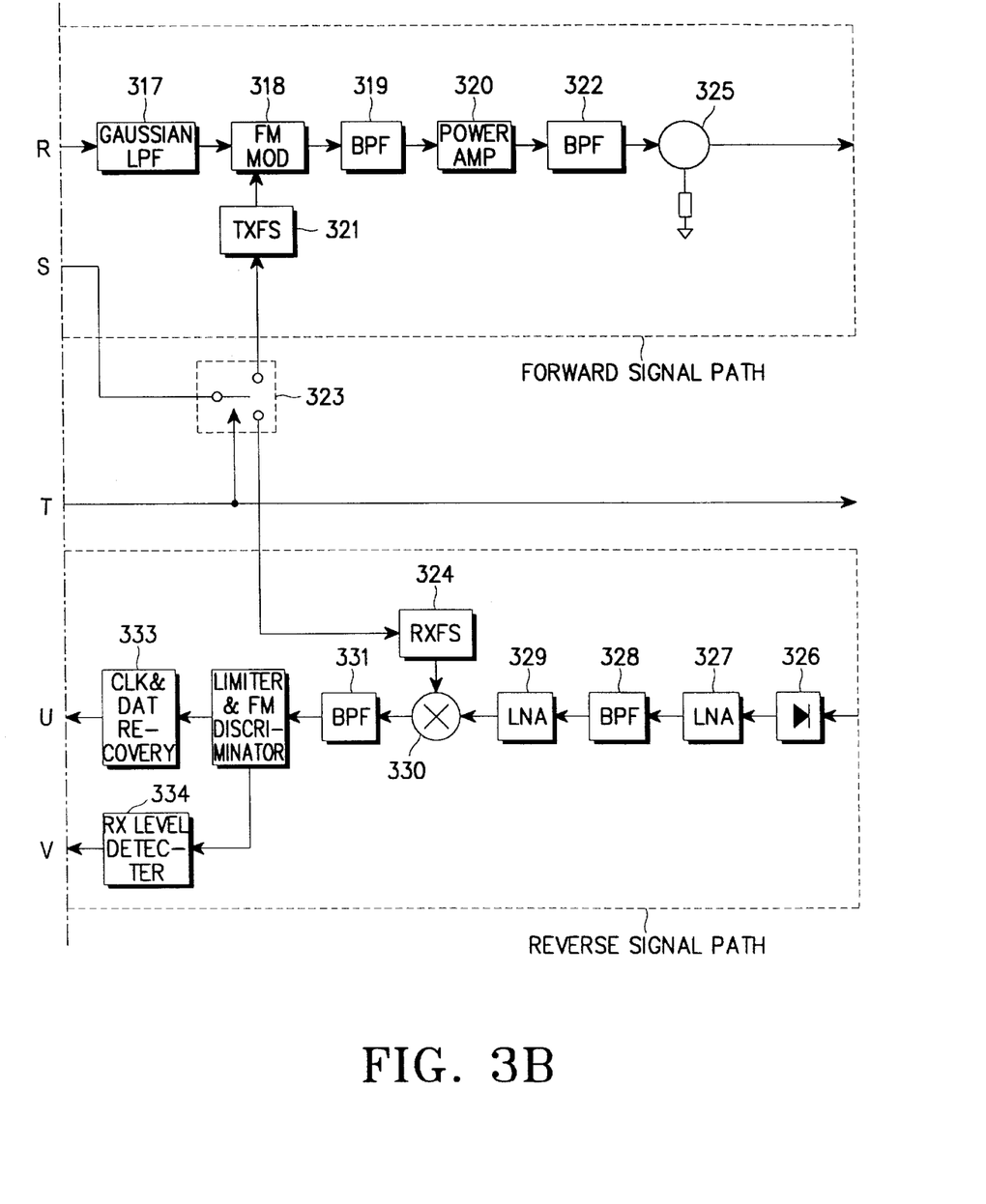

Turn now to FIGS. 3A and 3B, which are detailed diagrams of transmission and reception signal paths, in accordance with the principles of the present invention. FIGS. 3A and 3B illustrate a detailed structure of the forward and reverse signal paths for a specific channel of FIGS. 2A and 2B. In the forward signal path, transmission data of the specific channel may be classified into control data, signaling data and actual data. The control data and the signaling data output from a control and signaling data source 301 pass through a first in, first out (FIFO) memory 302, a Bose-Chaudhuri-Hocquenghem (BCH) encoder 303, and a repeater 304. The actual data output from a data source 305 passes through a first in, first out (FIFO) memory 306 and an interleaver 307 or through the first in, first out (FIFO) memory 306. One of the three data sources is selected in a data source selector 309, and then the selected data is scrambled for data bit randomization in a scrambler 310 and buffered in a buffer 311 which temporarily stores data necessary for the time division duplexing (TDD) system. Here, the buffer 311 sequentially receives data at a data rate 16 Kbps and outputs (or bursts) the data at a data rate 32 Kbps. An output of the buffer 311 is input to a time division duplexing packetizer and converted to data in the time division duplexing packet format The reference numeral 312 here can also refer to a time division duplexing packet formatter 312.

Further, a hop pattern generator (HPG) 315 generates a hop pattern using time of day (TOD) and key code output from a time of day (TOD) and key coding element 314, and a hop pattern-to-frequency mapper (HFM) 316 generates hopping frequency control data to the forward signal switch 202.

Figure 4A:
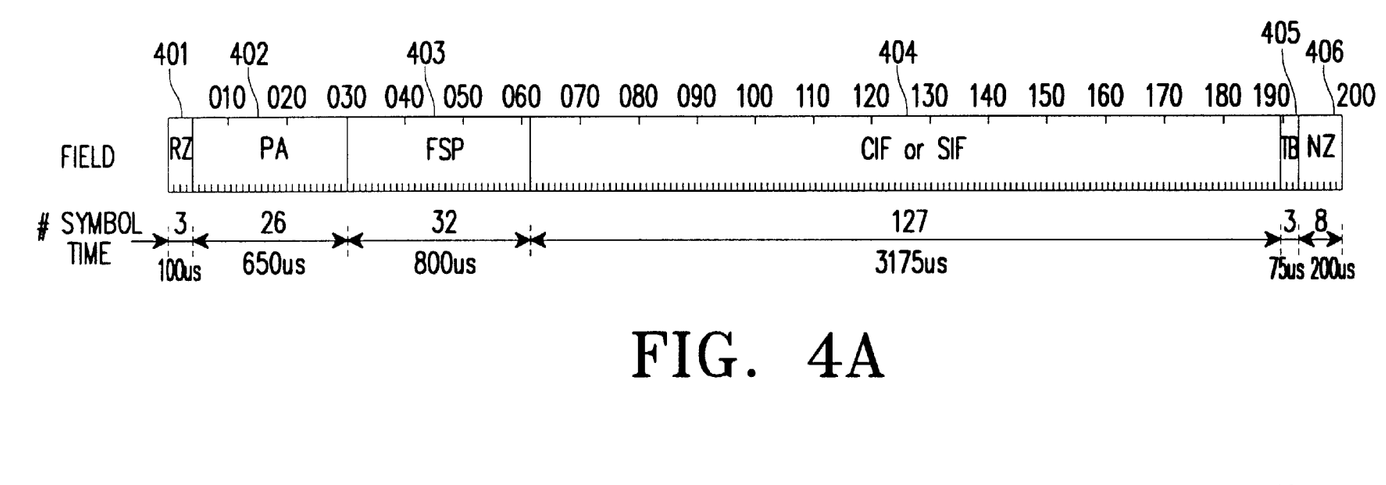
FIGS. 4A and 4B are diagrams illustrating time division duplexing (TDD) packet formats used for the base station transceiver, in accordance with the principles of the present invention.
Figure 4B:
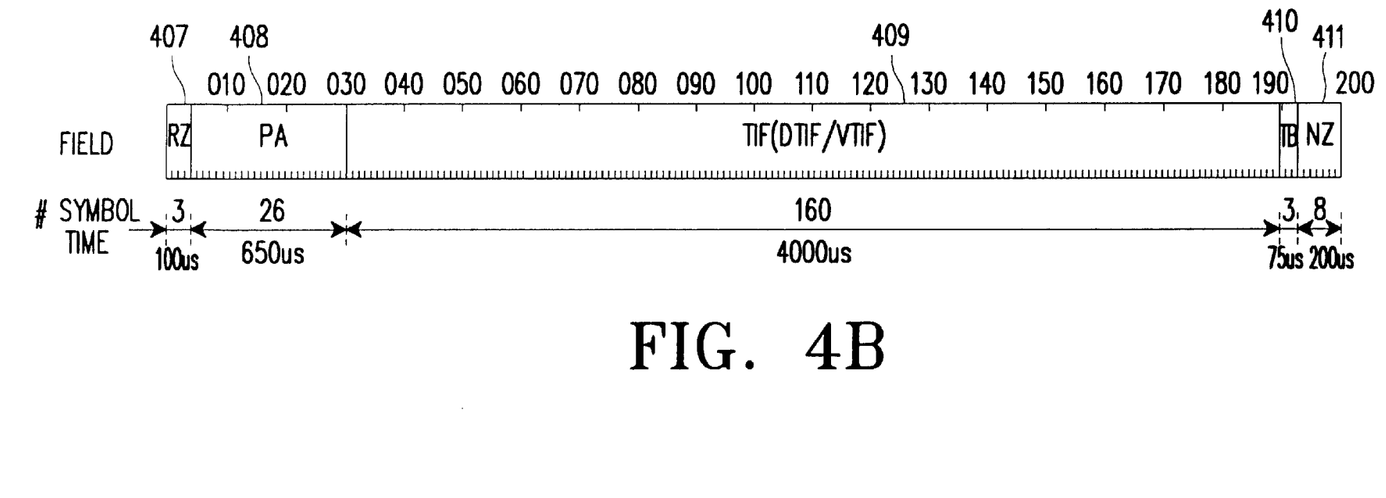

Turn now to FIGS. 4A and 4B, which are diagrams illustrating time division duplexing (TDD) packet formats used for the base station transceiver, in accordance with the principles of the present invention. FIGS. 4A and 4B illustrate the packet format used in the time division duplexing frequency hopping/code division multiple access system, generated from time division duplexing packetizer 312. Specifically, FIG. 4A illustrates a control or signaling packet format in case where the source data is the control signal or the signaling signal, and FIG. 4B illustrates a traffic packet format in case where the source data is traffic data. The control/signaling packet is composed of a ramp zone (RZ) 401, a preamble pattern (PA) 402, a time division duplexing (TDD) frame sync pattern (FSP) 403, control/signaling information (CIF or SIF) 404, a tail bit (TB) 405, and a null zone (NZ) 406 for round trip delay. See FIG. 4A. On the other hand, the data or voice traffic packet is composed of a ramp zone (RZ) 407, a preamble pattern (PA) 408, traffic information (TIF) 409, a tail bit (TB) 410, and a null zone (NZ) 411. See FIG. 4B.

The signal converted to the time division duplexing packet format in the time division duplexing packetizer 312 is switched in the forward signal switch 202 according to a frequency band to which the hopping frequency belongs.

Figure 5:
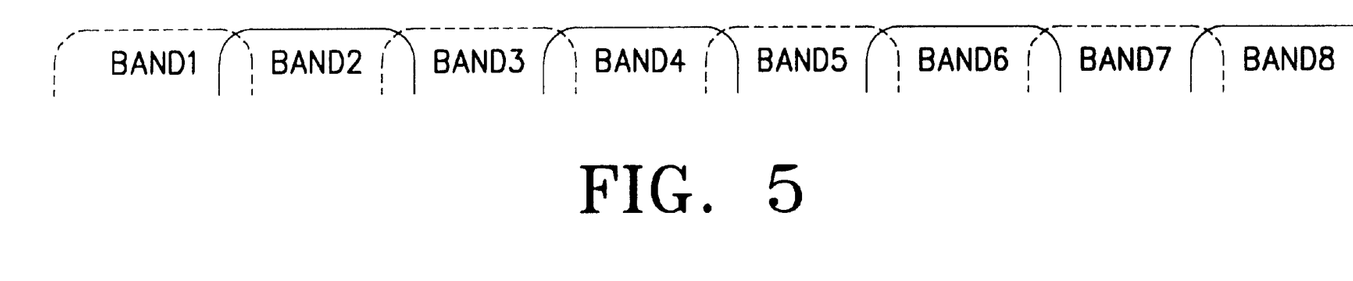
FIG. 5 is a diagram illustrating frequency bands allocated to the respective channels, in accordance with the principles of the present invention.

Turn now to FIG. 5, which is a diagram illustrating frequency bands allocated to the respective channels, in accordance with the principles of the present invention. With reference to FIG. 5, the whole available frequency band is divided into N bands each having the same bandwidth In FIG. 5, the number of bands depicted is 8 because N is equal to 8 here.

Figure 6:
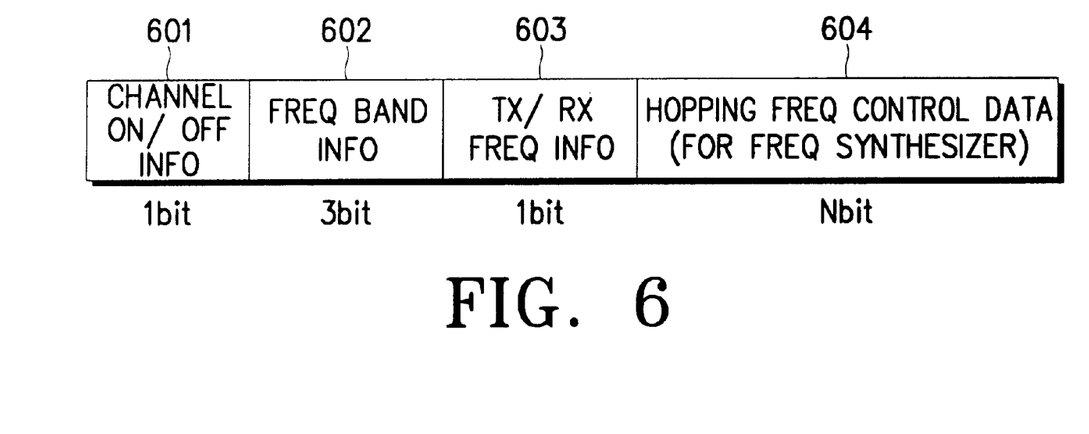
FIG. 6 is a diagram illustrating a format of hopping frequency control data, in accordance with the principles of the present invention.

Turn now to FIG. 6, which is a diagram illustrating a format of hopping frequency control data, in accordance with the principles of the present invention. The hopping frequency control data generated from the hop pattern-to-frequency mapper (HFM) 316 has the format shown in FIG. 6. In the drawing, the format includes a first 1-bit field 601, a second 3-bit field 602, a third 1-bit field 603 and a fourth N-bit field 604. The first field 601 denotes channel ON/OFF information, and the second field 602 denotes the frequency band to which the hopping frequency of the fourth field 604 belongs. The third field 603 denotes whether the hopping frequency is a frequency for transmission or reception. The fourth field 604 denotes the hopping frequency control data for controlling a frequency synthesizer to generate the hopping frequency.

Figure 7:
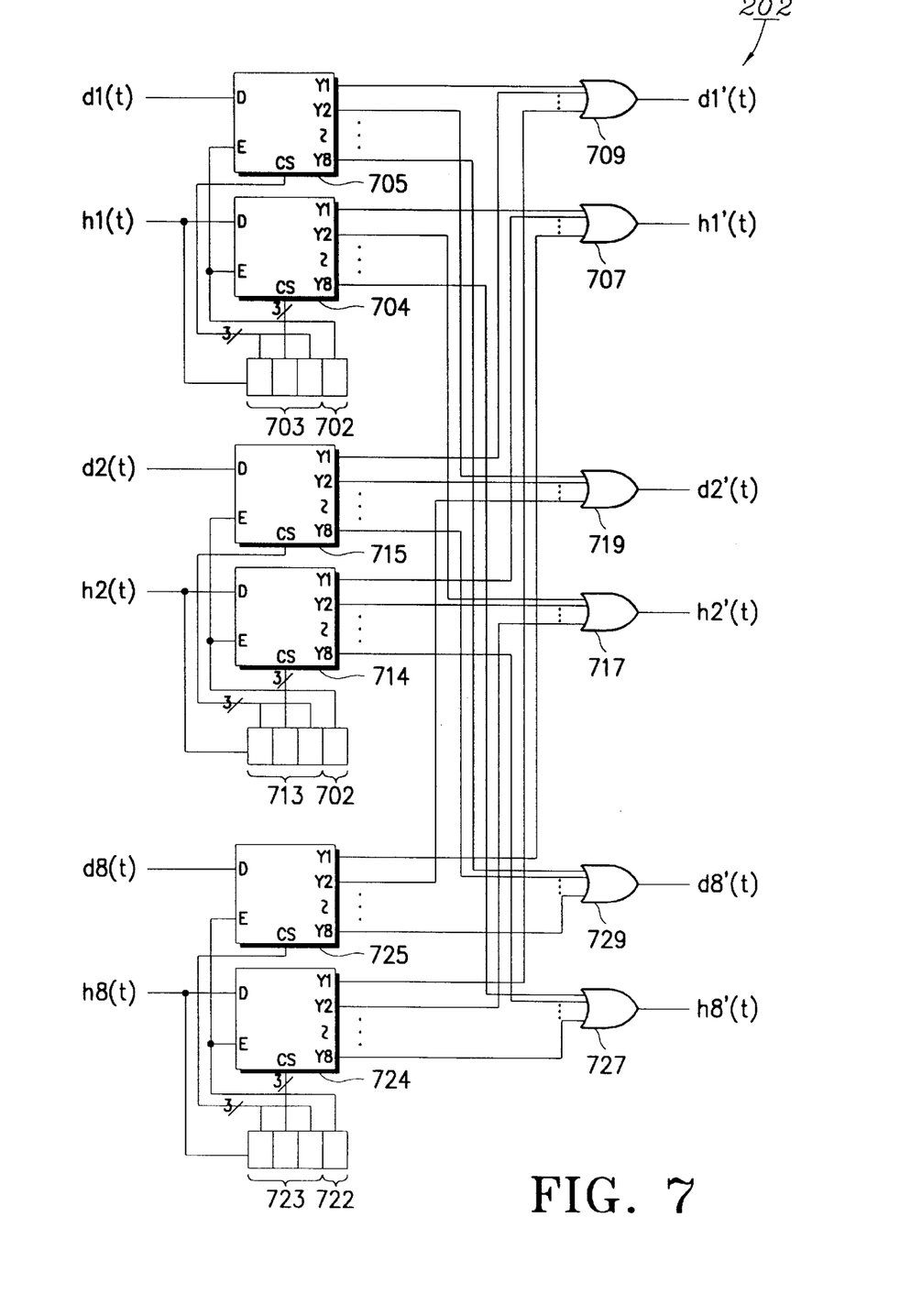
FIG. 7 is a detailed diagram of a forward signal switch 202 of FIG. 2A, in accordance with the principles of the present invention.

Turn now to FIG. 7, which is a detailed diagram of a forward signal switch 202 of FIG. 2A, in accordance with the principles of the present invention. The hopping frequency control data h1(t) generated from the hop pattern-to-frequency mapper (HFM) 316 has the format of FIG. 6, in which the 1-bit channel ON/OFF information of the first field 601 is stored in a register 702, for controlling ON/OFF (enabling/disabling) of demultiplexers 704 and 705, and the 3-bit frequency band information of the second field 602 is stored in a register 703, for demultiplexing input data h1(t) and d1(t) of the demultiplexers 704 and 705 to output nodes Y1–Y8. That is, the hopping frequency control data h1(t) and the data d1(t) to be transmitted are switched to the frequency band to which the hopping frequency control data h1(t) belongs. The hopping frequency control data h2(t), h3(t), h4(t), h5(t), h6(t), h7(t), and h8(t) are treated in the same manner.

In FIG. 7, subsequently, the hopping frequency control data h1(t) of the first frequency band is output as h1'(t) through an OR gate 707, and the transmission data d1(t) of the first frequency band is output as d1'(t) through an OR gate 709. In the same manner, the hopping frequency control data h8(t) of the eight frequency band is output as h8'(t) through an OR gate 727, and the transmission data d8(t) of the eight frequency band is output as d8'(t) through an OR gate 729.

Refer now to FIGS. 2A, 3B, and 7. The transmission signals output from the forward signal switch 202 are filtered in a Gaussian lowpass filter 317 and FM-modulated in an FM modulator 318, thus being Gaussian minimum shift keying (GMSK) modulated. In other words, the transmission signals output from the forward signal switch 202 are filtered in a Gaussian lowpass filter 317 and frequency modulated in a frequency modulator 318, thus being Gaussian minimum shift keying modulated.

With reference to FIGS. 2A, 3B, 6, and 7, a carrier used in the frequency-modulated modulator 318 is generated from a transmission frequency synthesizer (TXFS) 321 which is so controlled as to generate the hopping frequency having the carrier. That is, the hopping frequency control data generated from the hop pattern-to-frequency mapper (HFM) 316 is switched in the forward signal switch 202, and the hopping frequency control data is transferred in a transmission/reception selector 323 to the transmission frequency synthesizer 321 or a reception frequency synthesizer (RXFS) 324, in response to the time division duplexing switching control signal generated from the time division duplexing timing controller 212 and the 1-bit transmission/reception frequency information of the third field 603 of FIG. 6.

With reference to FIG. 3B, an output of the transmission frequency synthesizer 321 is applied to the frequency-modulated modulator 318 to be frequency-modulated. The hopping frequency control data generated from the hop pattern-to-frequency mapper (HFM) 316 is changed hop-by-hop, so that the hopping frequency generated from the transmission frequency synthesizer 321 is also changed (that is, hopped) hop-by-hop.

This hopping frequency, that is, the hopping carrier generated in this way, is modulated in the frequency-modulated modulator 318. An output of the frequency-modulated modulator 318 is filtered in a bandpass filter (BPF) 319, amplified in a power amplifier 320, filtered in a bandpass filter 322, and then transferred to the corresponding time division duplexing switches 207 through an isolator 325. See FIGS. 2B and 3B.

With reference to FIG. 2B, the time division duplexing switches 207 are controlled by the time division duplexing timing controller 212. When a time division duplexing timing control signal represents a transmission mode, the time division duplexing switches 207 connect with the transmission path to transmit the transmission signal to the antenna 210. When the time division duplexing timing control signal represents a reception mode, the time division duplexing switches 207 connect with the reception path to input the signal received through the antenna 211 to the receiving section. Here, unlike the time division duplexing switch 105 used in FIG. 1, the time division duplexing switches 207 are low-powered time division duplexing switches.

That is, the base station transceiver of the invention includes N low-powered time division duplexing switches 207 for the respective channels, instead of the single high-powered time division duplexing switch 105 of FIG. 1, thereby facilitating the realization and design of the time division duplexing switch. The transmission signals output from the time division duplexing switches 207 are input to the bandpass filters 208 having the different pass bands as shown in FIG. 5. That is, the bandpass filters 208 are arranged in the sequence B1, B2, B3, B4, B5, B6, B7 and B8 having the unique pass bands BAND1, BAND2, BAND3, BAND4, BAND5, BAND5, BAND6, BAND7 and BAND8, respectively.

Outputs of the bandpass filters 208 are coupled in the junction coupler 209. In order to reduce the mutual interference among the channels, the junction coupler 209 couples the outputs of (B2n−1)th bandpass filters (where n=1,2, . . . , N/2: that is, the bandpass filters B1, B3, B5 and B7) to transfer the coupled signals to the antenna 210, and couples the outputs of (B2n)th bandpass filters (where n=1,2, . . . , N/2: that is, the bandpass filters B2, B4, B6 and B8) to transfer the coupled signal to the antenna 211. This coupling method utilizing the bandpass filters 208 and the junction coupler 209 has the advantages of the low power consumption, the light weight, the reduced size, the reduced coupling loss and the reduced dividing loss, as compared with the coupling method utilizing the radio frequency multi-coupler 104 and the radio frequency divider 107 of FIG. 1. The reduced coupling loss is approximately 5 or 6 decibels (dB) when N is equal to 8. The transmission signals transferred to the antennas 210 and 211 are radiated in the air.

A radio signal captured by the antennas 210 and 211 passes through the reverse signal path. The received signal is divided in the junction coupler 209 and passed through the bandpass filters 208 and the time division duplexing switches 207. When the time division duplexing timing control signal output from the time division duplexing timing controller 212 represents the reception mode, the time division duplexing switches 207 connect with the reverse signal path and transfer the signals to the reverse pre-processors 204.

The reverse signal switch 205 switches the signals output from the reverse pre-processors 204, and the outputs of the reverse signal switch 205 are transferred to the corresponding subscribers by the channels through the reverse post-processors 206. That is, the signals processed in the pre-processors 204 are switched in the reverse signal switch 205 and output through the reverse post-processor 206. The reverse pre-processors 204, the reverse signal switch 205 and output through the reverse post-processor 206, illustrated in FIGS. 3A and 3B, constitute the reverse signal path which is opposed to the forward signal path. The signal received from one of the time division duplexing switches 207 is passed through an overpower protector 326, a low-noise amplifier (LNA) 327, a bandpass filter 328, and a low-noise amplifier 329, and then mixed in a mixer 330 with a reception local signal output from the reception hopping frequency synthesizer 324, thus being down-converted.

Here, the reception hopping frequency synthesizer 324 is also controlled by the hopping frequency control data generated through the hop pattern-to-frequency mapper (HFM) 316, the forward signal switch 202 and the transmission/ reception selector 323. An output of the mixer 330 is converted to a baseband signal through a bandpass filter 331 and a limiter/FM discriminator 332, and then applied to a clock and data demodulator 333 which demodulates the clock and data. Further, a reception level detector 334 detects a received signal strength indication (RSSI) signal from the output signal of the limiter/FM discriminator 332. Outputs of the clock and data demodulator 333 and the reception level detector 334 are switched in the reverse signal switch 205 which has the same structure and operation as those of the forward signal switch 202 shown in FIG. 7. The signals switched in the reverse signal switch 205 are input to a time division duplexing depacketizer 336 and a reception signal-to-noise ratio estimator 337.

The data output from the time division duplexing depacketizer 336 which performs a reverse operation of the time division duplexing packetizer 312 is de-buffered in a de-buffering element 338 and descrambled in a descrambler 339 which performs a reverse operation of the scrambler 310. In a data selector 340, the data output from the descrambler 339 is selectively output to different signal paths according to the types of the data. That is, when the data is the data traffic, it is de-interleaved in a de-interleaver 341 and input to the data sink 305 through a first in, first out (FIFO) memory 345. When the data is the voice traffic, it is input to the data sink 305 through the first in, first out (FIFO) memory 345. When the data is the control or signaling signal, it is input to the control/signaling sink 301 through a majority voting element 343, a Bose-Chaudhuri-Hocquenghem (BCH) decoder and a first in, first out (FIFO) memory 346. All the other channels also have the same forward and reverse signal processing flows as described heretofore.

As an example demonstrating the operation of the first in, first out (FIFO) memory 346, see below. The memory 346 receives alpha data first and then later receives beta data The memory 346 is designed so that the alpha data will be output prior to the beta data being output. Hence the name first in, first out.

As described above, the base station transceiver of the invention employs the junction coupling structure utilizing forward/reverse digital switches and bandpass filters, instead of the multi-coupling structure, thereby contributing to the reduction in size and weight. Further, it is possible to reduce the power consumption and the coupling and dividing loss of the radio frequency signal. Besides, the single high-powered time division duplexing switch which is difficult of realization can be replaced with the low-powered time division duplexing switches.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept

What is claimed is:

1. An apparatus, comprising:

a plurality of first preprocessing units receiving and then scrambling first control data, signal data, and traffic data, packetizing the scrambled data to divide the scrambled data into packets, generating frequency control data controlling hopping frequencies, and outputting said packetized data and said frequency control data;

a first signal switch switching said packetized data and said frequency control data output from said plurality of first preprocessing units, and outputting primary signals corresponding to said switched data;

a plurality of first postprocessing units lowpass-filtering said primary signals output from said first signal switch, frequency modulating said lowpass-filtered signals with a secondary signal synthesizing transmission frequency, and filtering and amplifying said frequency modulated signals at a transmission frequency band;

a selection unit selecting a path from among a transmission path and a reception path;

a plurality of second preprocessing units demodulating received signals selected by said selection unit with a tertiary signal synthesizing reception frequency to restore clock and data, and detecting a received signal strength indication signal;

a second signal switch switching signals output from said plurality of second preprocessing units;

a plurality of second postprocessing units measuring signal-to-noise ratios of signals output from said second signal switch, and de-packetizing and unscrambling said signals output from said second signal switch to divide said signals into said first control data, said signal data, and said traffic data; and a control unit being coupled to said selection unit and generating a timing control signal utilizing time division duplexing to control said selection unit wherein said apparatus corresponds to a base station transceiver for a frequency hopping code division multiple access system.

2. The apparatus of claim 1, wherein said first control data and signal data received by said plurality of first preprocessing units correspond to Bose-Chaudhuri-Hocquenghem encoded control data and Bose-Chaudhuri-Hocquenghem encoded signal data respectively.

3. The apparatus of claim 1, wherein said traffic data received by said plurality of first preprocessing units correspond to interleaved traffic data.

4. The apparatus of claim 1, wherein said first control data, said signal data, and said traffic data received by said plurality of first preprocessing units are conveyed on a forward path corresponding to the transmission path.

5. The apparatus of claim 4, wherein said plurality of first preprocessing units, said first signal switch, and said plurality of first postprocessing units are coupled in the forward path corresponding to the transmission path.

6. The apparatus of claim 1, wherein said received signals received by said selection unit are conveyed on a reverse path corresponding to the reception path.

7. The apparatus of claim 6, wherein said plurality of second preprocessing units, said second signal switch, and said plurality of second postprocessing units are coupled in the reverse path corresponding to the reception path.

8. The apparatus of claim 1, wherein said selection unit is selectively coupled to units chosen from among said first postprocessor units and said second preprocessor units in accordance with said timing control signal received from said control unit.

9. The apparatus of claim 1, said plurality of first preprocessor units corresponding to N first preprocessor units, said plurality of first postprocessor units corresponding to N first postprocessor units, said plurality of second preprocessor units corresponding to N second preprocessor units, and said plurality of second postprocessor units corresponding to N second postprocessor units, wherein the symbol N represents a number.

10. The apparatus of claim 9, wherein said first signal switch further comprises:
- a plurality of N first demultiplexers respectively demultiplexing first to Nth channel transmission data respectively output from said N first preprocessing units, said first to Nth channel transmission data corresponding to said packetized data;
- a plurality of N second demultiplexers respectively demultiplexing first to Nth hopping frequencies respectively output from said N first preprocessing units, said first to Nth hopping frequencies corresponding to said frequency control data;
- a plurality of registers storing frequency band information controlling said N first demultiplexers and said N second demultiplexers;
- a plurality of N first digital OR gates respectively generating output data from outputs of said N first demultiplexers; and
- a plurality of N second digital OR gates respectively generating first to N-th output hopping frequencies from outputs of said N second demultiplexers.

11. An apparatus, comprising:
- a plurality of N forward preprocessors respectively processing transmission signals of a plurality of N channels, wherein the symbol N represents a number corresponding to a quantity;
- a forward signal switch switching said transmission signals to unused channels;
- a plurality of N forward postprocessors processing output signals of said forward signal switch;
- a plurality of N time division duplexing switches being switchable to a path selected from among a forward signal path and a reverse signal path according to a timing control signal utilizing time division duplexing, said N time division duplexing switches respectively receiving said processed signals output from said N forward postprocessors;
- a timing controller generating said timing control signal;
- a plurality of N bandpass filters bandpass-filtering output signals of said time division duplexing switches;
- a junction coupler coupling output signals of said bandpass filters;
- first and second antennas transmitting coupled signals output from said junction coupler, and receiving radio signals;
- said bandpass filters bandpass-filtering said radio signals received through said first and second antennas;
- said time division duplexing switches switching said radio signals to the reverse signal path according to said timing control signal;
- a plurality of N reverse preprocessors processing output signals of said time division duplexing switches;
- a reverse signal switch switching the processed signals output from said reverse preprocessors to unused channels;
- a plurality of N reverse postprocessors processing the switched signals output from said reverse signal switch, wherein said apparatus corresponds to a base station transceiver for a frequency hopping code division multiple access system.

12. The apparatus of claim 11, said processing of said transmission signals performed by said plurality of forward preprocessors corresponds to scrambling Bose-Chaudhuri-Hocquenghem encoded control data and scrambling Bose-Chaudhuri-Hocquenghem encoded signal data.

13. The apparatus of claim 12, wherein said scrambling randomizes data bits.

14. The apparatus of claim 11, wherein said junction coupler couples the outputs of odd-numbered bandpass filters to transfer the coupled signals to said first antenna, and couples the outputs of even-numbered bandpass filters to transfer the coupled signals to said second antenna, so as to reduce mutual interference among the channels.

15. A method, comprising:
- receiving and then scrambling first control data, signal data, and traffic data, packetizing the scrambled data to divide the scrambled data into packets, generating frequency control data controlling hopping frequencies, and outputting said packetized data and said frequency control data;
- switching said packetized data and said frequency control data, and outputting primary signals corresponding to said switched data, said switching of said packetized data and said frequency control data being performed by a first signal switch;
- lowpass-filtering said primary signals, frequency modulating said lowpass-filtered signals with a secondary signal synthesizing transmission frequency, and filtering and amplifying said frequency modulated signals at a transmission frequency band;
- selecting a path from among a transmission path and a reception path, said selecting being performed by a plurality of special switches;
- demodulating received signals when the reception path is selected, said demodulating being performed with a tertiary signal synthesizing reception frequency to restore clock and data, and detecting a received signal strength indication signal;
- switching demodulated received signals and outputting switched signals, said switching of said demodulated received signals being performed by a second signal switch;
- measuring signal-to-noise ratios of said switched signals, and de-packetizing and unscrambling said switched signals to divide said signals into said first control data, said signal data, and said traffic data; and
- generating a timing control signal utilizing time division duplexing to control said selecting of said path by said plurality of special switches, wherein said method corresponds to operations of a base station transceiver for a frequency hopping code division multiple access system.

16. The method of claim 15, wherein said first control data and said signal data correspond to Bose-Chaudhuri-Hocquenghem encoded control data and Bose-Chaudhuri-Hocquenghem encoded signal data respectively.

17. The method of claim 15, wherein said traffic data correspond to interleaved traffic data.

18. The method of claim 15, further comprising:

first demultiplexing first to Nth channel transmission data, said first to Nth channel transmission data corresponding to said packetized data, said first demultiplexing being performed by a first plurality of N demultiplexers;

second demultiplexing first to Nth hopping frequencies, said first to Nth hopping frequencies corresponding to said frequency control data, said second demultiplexing being performed by a second plurality of N demultiplexers;

storing frequency band information controlling said N first demultiplexers and said N second demultiplexers;

generating output data from outputs of said N first demultiplexers; and generating first to Nth output hopping frequencies from outputs of said N second demultiplexers.

19. The method of claim 15, wherein said plurality of special switches correspond to a plurality of low powered time division duplexing switches.

20. The method of claim 15, wherein said special switches do not have a high coupling loss.

* * * * *